(12) United States Patent
Sherlock (10) Patent No.: US 10,472,798 B2
(45) Date of Patent: Nov. 12, 2019

(54) WORK IMPLEMENT CONTROL BASED ON TIRE PRESSURE IN A CONSTRUCTION VEHICLE

(71) Applicant: Deere & Company, Moline, IL (US)

(72) Inventor: Lance R. Sherlock, Asbury, IA (US)

(73) Assignee: DEERE & COMPANY, Moline, IL (US)

( * ) Notice: Subject to any disclaimer, the term of this patent is extended or adjusted under 35 U.S.C. 154(b) by 129 days.

(21) Appl. No.: 15/710,231

(22) Filed: Sep. 20, 2017

(65) Prior Publication Data

US 2019/0085530 A1 Mar. 21, 2019

(51) Int. Cl.
*E02F 3/84* (2006.01)
*E02F 9/20* (2006.01)
*B60C 23/04* (2006.01)

(52) U.S. Cl.
CPC ............ *E02F 3/845* (2013.01); *E02F 9/2025* (2013.01); *B60C 23/0408* (2013.01)

(58) Field of Classification Search
CPC ....... E02F 3/845; E02F 9/2025; E02F 3/3414; E02F 3/847; E02F 9/2029; E02F 9/24; B60C 23/0408; B60C 23/002; B60C 23/041
See application file for complete search history.

(56) References Cited

U.S. PATENT DOCUMENTS

| | | | |
|---|---|---|---|
| 3,656,557 A * | 4/1972 | Eskelson | A01B 31/00 172/387 |
| 6,470,251 B1 * | 10/2002 | Enix | E02F 3/847 172/4.5 |
| 7,496,441 B2 * | 2/2009 | Brandt | E02F 3/3414 137/625.64 |
| 2004/0061601 A1 * | 4/2004 | Freakes | B60C 23/0408 340/442 |
| 2008/0127530 A1 * | 6/2008 | Kelly | E02F 3/847 37/403 |
| 2010/0212276 A1 * | 8/2010 | Digman | A01D 75/287 56/10.2 E |
| 2011/0108294 A1 * | 5/2011 | Thomson | E02F 3/764 172/1 |
| 2013/0046439 A1 * | 2/2013 | Anderson | B60C 23/002 701/36 |
| 2013/0054078 A1 * | 2/2013 | Anderson | B60C 23/002 701/29.1 |
| 2015/0176253 A1 * | 6/2015 | Taylor | E02F 3/3414 701/50 |

* cited by examiner

*Primary Examiner* — Arpad Fabian-Kovacs
(74) *Attorney, Agent, or Firm* — Taft Stettinius & Hollister LLP; Stephen F. Rost (57) ABSTRACT

A work vehicle grade control system for a vehicle having a plurality of pneumatic tires, a frame supported by the plurality of tires, and a grader blade configured to move with respect to the frame to grade a surface. The grade control system includes an actuator operatively connected to the grader blade, wherein the actuator is configured to move the grader blade with respect to the frame based on one or more tire pressures. The grade control system includes control circuitry configured to identify a current grade of the surface; identify a position of the grader blade with respect to the surface; identify the one or more tire pressure of one or more of the plurality of tires; and adjust the position of the grader blade with respect to the frame based on the identified current grade and the identified tire pressure of the one or more plurality of pneumatic tires.

20 Claims, 4 Drawing Sheets

WORK IMPLEMENT CONTROL BASED ON TIRE PRESSURE IN A CONSTRUCTION VEHICLE

FIELD OF THE DISCLOSURE

The present disclosure relates to a work vehicle having an adjustable work implement, and in particular a motor grader having a blade wherein a blade angle is adjusted based on tire pressure.

BACKGROUND

A work vehicle, such as a motor grader, can be used in construction and maintenance for creating a flat surface at various angles, slopes, and elevations. When paving a road for instance, a motor grader can be used to prepare a base foundation to create a wide flat surface to support a layer of asphalt. A motor grader can include two or more axles, with an engine and cab disposed above the axles at the rear end of the vehicle and another axle disposed at the front end of the vehicle.

Motor graders include a drawbar assembly attached near the nose of the grader which is pulled by the grader as it moves forward. The drawbar assembly rotatably supports a circle drive member at a free end of the drawbar assembly and the circle drive member supports a work implement, such as the blade. The blade, also called a mouldboard, is attached to the vehicle between the front axle and rear axle. The angle of the work implement beneath the drawbar assembly can be adjusted by the rotation of the circle drive member relative to the drawbar assembly.

In addition to the blade being rotated about a rotational fixed axis, the blade is also adjustable to a selected angle with respect to the circle drive member. This angle is known as blade slope. The elevation of the blade is also adjustable.

To properly grade a surface, the motor grader includes a plurality of sensors which measure the orientation of the vehicle with respect to gravity and the location of the blade with respect to the vehicle. A rotation sensor located at the circle drive member provides a rotational angle of the blade with respect to a longitudinal axis defined by a length of the vehicle. A blade slope sensor provides a slope angle of the blade with respect to a lateral axis which is generally aligned with a vehicle lateral axis, such as defined by the vehicle axles. A mainfall sensor provides an angle of travel of the vehicle with respect to gravity.

Machine control systems, which include two dimensional (2D) and three dimensional (3D) machine control systems, can be located at or near the surface being graded to provide grade information to the motor grader. A vehicle grade control system receives signals from the machine control system to enable the motor grader to grade the surface. The motor grader includes a grade control system operatively coupled to each of the sensors, so that the surface being graded can be graded to the desired slope, angle, and elevation. The desired grade of the surface is planned ahead of or during a grading operation.

Machine control systems can provide slope, angle, and elevation signals to the vehicle grade control system to enable the motor grader or an operator to adjust the slope, angle, and elevation of the blade. The vehicle grade control system can be configured to automatically control the slope, angle, and elevation of the blade to grade the surface based on desired slopes, angles, and elevations as is known by those skilled in the art. In these automatic systems, adjustments to the position of the blade with respect to the vehicle are made constantly to the blade in order to achieve the slope, angle and/or elevation targets.

The position of the blade with respect to the surface can be affected by various operating conditions of the work vehicle such as the mechanical conditions of the drawbar assembly, the circle drive member, and even tire pressure.

What is needed, therefore, is a control system to control the angle of the implement with respect to the surface when the work vehicle is affected by changing operating conditions.

SUMMARY

In one embodiment of the present disclosure, there is provided a method of adjusting a position of a work implement coupled to a work vehicle having a frame supported by a plurality of tires configured to be pressurized to a predetermined tire pressure. The method includes: identifying a position of the work implement with respect to the frame; identifying a tire pressure of one or more of the plurality of tires; and adjusting the position of the work implement with respect to the frame based on the identified tire pressure of the one or more plurality of tires.

In another embodiment of the present disclosure, there is provided a work vehicle including a work implement operatively connected to a frame supported for movement over a surface by a plurality of pneumatic tires. The work vehicle includes an actuator operatively connected to the work implement, wherein the actuator is configured to move the work implement with respect to the frame. Control circuitry is operatively connected to the actuator and includes a processer and a memory, wherein the memory is configured to store program instructions. The processor is configured to execute the stored program instructions to: identify a position of the work implement with respect to the vehicle frame; identify a tire pressure of one or more of the plurality of tires; and adjust the position of the work implement with respect to the frame based on the identified tire pressure of the one or more plurality of pneumatic tires.

In still another embodiment of the present disclosure, there is provided a work vehicle grade control system for a vehicle having a plurality of pneumatic tires, a frame supported by the plurality of tires, and a grader blade configured to move through a range of positions with respect to the frame to grade a surface. The control system includes an actuator operatively connected to the grader blade, wherein the actuator is configured to move the grader blade with respect to the frame, and control circuitry operatively connected to the actuator. The control circuitry includes a processer and a memory, wherein the memory is configured to store program instructions. The processor is configured to execute the stored program instructions to: identify a current grade of the surface; identify a position of the grader blade with respect to the surface; identify a tire pressure of one or more of the plurality of tires; and adjust the position of the grader blade with respect to the frame based on the identified current grade and the identified tire pressure of the one or more plurality of pneumatic tires.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
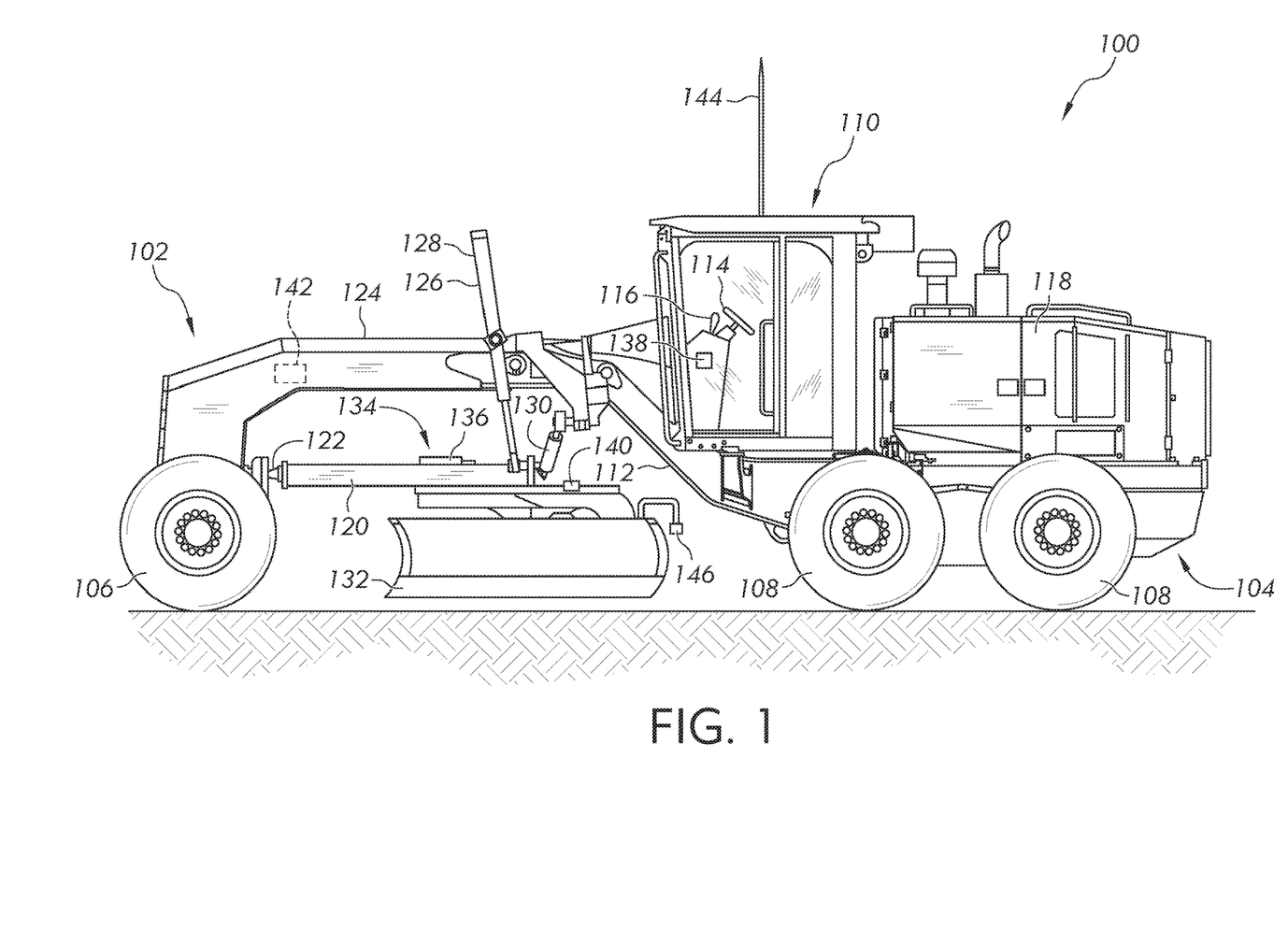
FIG. 1 is an elevational side view of a motor grader.

Referring to FIG. 1, an exemplary embodiment of a vehicle, such as a motor grader 100, is shown. An example of a motor grader is the 772G Motor Grader manufactured and sold by Deere & Company. As shown in FIG. 1, the motor grader 100 includes front frame 102 and rear frame 104, with the front frame 102 being supported on a pair of front wheels 106, and with the rear frame 104 being supported on right and left tandem sets of rear wheels 108. An operator cab 110 is mounted on an upwardly and forwardly inclined rear region 112 of the front frame 102 and contains various controls for the motor grader 100 disposed so as to be within the reach of a seated or standing operator. In one aspect, these controls may include a steering wheel 114 and a lever assembly 116. An engine 118 is mounted on the rear frame 104 and supplies power for all driven components of the motor grader 100. The engine 118, for example, is configured to drive a transmission (not shown), which is coupled to drive the rear wheels 108 at various selected speeds and either in forward or reverse modes. A hydrostatic front wheel assist transmission (not shown), in different embodiments, is selectively engaged to power the front wheels 106, in a manner known in the art. In one embodiment, the wheels 106 and 108 are pneumatic tires supported by rims as is known by those skilled in the art.

Mounted to a front location of the front frame 102 is a drawbar or draft frame 120, having a forward end universally connected to the front frame 102 by a ball and socket arrangement 122 and having opposite right and left rear regions suspended from an elevated central section 124 of the front frame 102. Right and left lift linkage arrangements including right and left extensible and retractable hydraulic actuators 126 and 128, respectively, support the left and right regions of the drawbar 120. The right and left lift linkage arrangements 126 and 128 either raise or lower the drawbar 120. A side shift linkage arrangement is coupled between the elevated frame section 124 and a rear location of the drawbar 120 and includes an extensible and retractable side swing hydraulic actuator 130. A work implement 132 is coupled to the front frame 102 and powered by a circle drive assembly 134. In different embodiment, the work implement 132 includes a blade or a mouldboard.

The drawbar 120 is raised or lowered by the right and left lift linkage arrangements 126 and 128 which in turn raises or lowers the blade 132 with respect to the surface. The actuator 130 raises or lowers one end of the blade 132 to adjust the slope of the blade. In other embodiments, the angle of the blade 132 is adjusted by actuating mechanisms configured to move the blade 132 in response to a control signal provided by an operator or in response to a control signal provided by a machine control system including sonic systems, laser systems, and global positioning systems (GPS).

The circle drive assembly 134 includes a rotation sensor 136, which in different embodiments, includes one or more switches that detect movement, speed, or position of the blade 132 with respect to the vehicle front frame 102. The rotation sensor 136 is electrically coupled to a controller 138, which in one embodiment is located in the cab 110. In other embodiments, the controller 138 is located in the front frame 102, the rear frame 104, or within an engine compartment housing the engine 118. In still other embodiments, the controller 138 is a distributed controller having separate individual controllers distributed at different locations on the vehicle. In addition, while the controller is generally hardwired by electrical wiring or cabling to sensors and other related components, in other embodiments the controller includes a wireless transmitter and/or receiver to communicate with a controlled or sensing component or device which either provides information to the controller or transmits controller information to controlled devices.

A slope sensor 140 is configured to detect the slope of the blade 132 and to provide slope information to the controller 138. In different embodiments, the slope sensor 140 is coupled to a support frame for the blade 132 of the hydraulic actuator 130 to provide the slope information. A mainfall sensor 142 is configured to detect the grading angle of the vehicle 100 with respect to gravity and to provide grading angle information to the controller 138. For instance, the mainfall sensor 142 measures the upward angle of the vehicle 100 as it moves up a hill.

An antenna 144 is located at a top portion of the cab 110 and is configured to receive signals from different types of machine control systems including sonic systems, laser systems, and global positioning systems (GPS). While the antenna 144 is illustrated, other locations of the antenna 144 are included as is known by those skilled in the art. For instance, when the vehicle 100 is using a sonic system, a sonic tracker 146 is used detect reflected sound waves transmitted by the sonic system through with the sonic tracker 146. In a vehicle 100 using a laser system, a mast (not shown) located on the blade supports a laser tracker located at a distance above the blade 132. In one embodiment, the mast includes a length to support a laser tracker at a height similar to the height of a roof of the cab. A GPS system includes a GPS tracker located on a mast similar to that provided for the laser tracker system. Consequently, the present disclosure applies vehicle motor grader systems using both relatively "simple" 2D cross slope systems and to "high end" 3D grade control systems.

Figure 2:
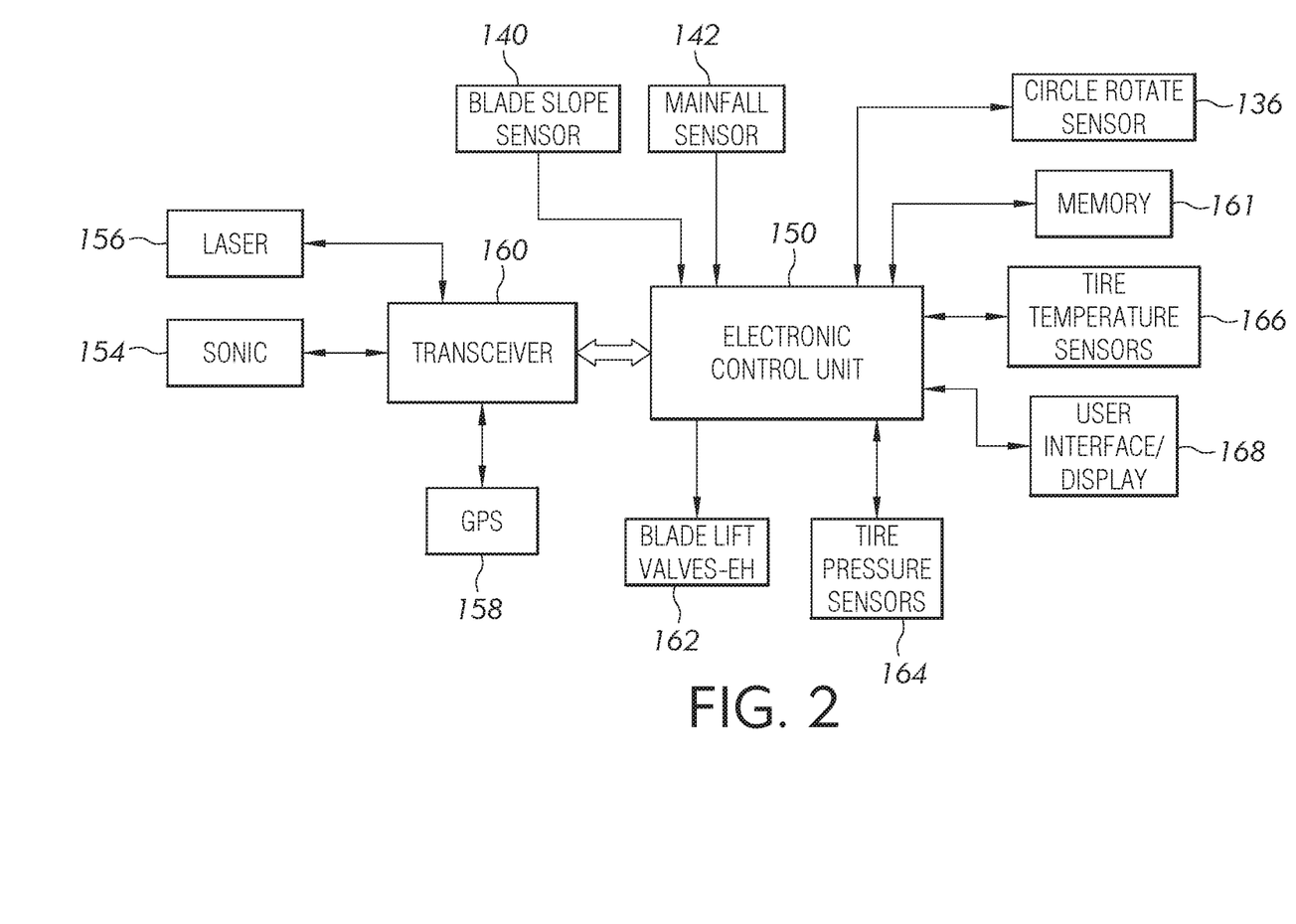
FIG. 2 is a simplified schematic diagram of a vehicle and a vehicle grade control system of the present disclosure.

FIG. 2 is a simplified schematic diagram of the vehicle 100 and a vehicle motor grader control system embodying the invention. In this embodiment, the controller 138 is configured as an electronic control unit (ECU) 150 operatively connected to a transmission control unit 152. The ECU 150 is located in the cab 110 of vehicle 100 and a transmission control unit and an engine control unit, not shown. The ECU 150 receives slope, angle, and/or elevation signals generated by one or more types of machine control systems including a sonic system 154, a laser system 156, and a GPS system 158. These signals are collectively identified as contour instructions or contour signals. Each of the machine control systems 154, 156, and 158 communicates with the ECU 150 through a transceiver 160 which is operatively connected to the appropriate type of antenna as is understood by those skilled in the art.

The ECU 150, in different embodiments, includes a computer, computer system, or other programmable devices. In other embodiments, the ECU 150 can include one or more processors (e.g. microprocessors), and an associated memory 161, which can be internal to the processor of external to the processor. The memory 161 can include random access memory (RAM) devices comprising the memory storage of the ECU 150, as well as any other types of memory, e.g., cache memories, non-volatile or backup memories, programmable memories, or flash memories, and read-only memories. In addition, the memory can include a memory storage physically located elsewhere from the processing devices and can include any cache memory in a processing device, as well as any storage capacity used as a virtual memory, e.g., as stored on a mass storage device or another computer coupled to ECU 150. The mass storage device can include a cache or other dataspace which can include databases. Memory storage, in other embodiments, is located in the "cloud", where the memory is located at a distant location which provides the stored information wirelessly to the ECU 150.

The ECU 150 executes or otherwise relies upon computer software applications, components, programs, objects, modules, or data structures, etc. Software routines resident in the included memory of the ECU 150 or other memory are executed in response to the signals received. The computer software applications, in other embodiments, are located in the cloud. The executed software includes one or more specific applications, components, programs, objects, modules or sequences of instructions typically referred to as "program code". The program code includes one or more instructions located in memory and other storage devices which execute the instructions which are resident in memory, which are responsive to other instructions generated by the system, or which are provided a user interface operated by the user. The ECU 150 is configured to execute the stored program instructions.

The ECU 150 is also operatively connected to a blade lift valves assembly 162 which is in turn operatively connected to the right and left lift linkage arrangements 126 and 128 and the actuator 130, as illustrated in FIG. 1. The blade lift valves assembly 162, in one embodiment, is an electrohydraulic (EH) assembly which is configured to raise or lower the blade 132 with respect to the surface or ground and to one end of the blade to adjust the slope of the blade. In different embodiments, the valve assembly 162 is a distributed assembly having different valves to control different positional features of the blade. For instance, one or more valves adjusts one or both of the linkage arrangements 126 and 128 in response to commands generated by and transmitted to the valves and generated by the ECU 150. Another one or more valves, in different embodiments, adjusts the actuator 130 in response to commands transmitted to the valves and generated by the ECU 150. The ECU 150 responds to grade status information, provided by the sonic system 154, the laser system 156, and the GPS 158, and adjusts the location of the blade 132 through control of the blade lift valves assembly 162.

To achieve better productivity and to reduce operator error, the ECU 150 is coupled to one or more tire pressure sensors 164 and one or more tire temperature sensors 166. In different embodiments, only tire pressures sensors 164 or only tire temperature sensors 166 are included in one or more of the tires. In different embodiments, each of the tire pressure sensors 164 and tire temperature sensors 166 generate tire pressure values or tire temperature values as a signal which is transmitted wirelessly to the electronic control unit 150, as is understood by those skilled in the art. in one embodiment, the values of the tire pressures, as measured by the sensors and as embodied in the transmitted signals, are displayed on a user interface and/or display 168 of a user interface operatively connected to the ECU 150, typically located in the cab 110. In still other embodiments, the transmitted values of the tire temperatures are displayed on the display. In different embodiments, one or both of the tire pressures and the tire temperatures are only displayed upon a request made by the operator through the user interface. In different embodiments, the user interface/display 168 includes one or more of manually actuated controls, such as knobs, buttons, or toggle switches, a video display, and a touch screen display.

In one embodiment, the ECU 150 provides engine control instructions to the engine control unit and transmission control instruction to the transmission control unit to adjust the speed of the vehicle in response to grade information provided by one of the machine control systems including the sonic system 154, the laser system 156, and the GPS system 158. In other embodiments, other machine control systems are used. In addition, the ECU 150 adjusts the position of the blade 132, or other implement, based on grade information provided by one of the machine control systems including the sonic system 154, the laser system 156, and the GPS system 158, as well as information provided by one or more of the tire pressure sensor 164 or one or more of the tire temperature sensors 166.

Figure 3:
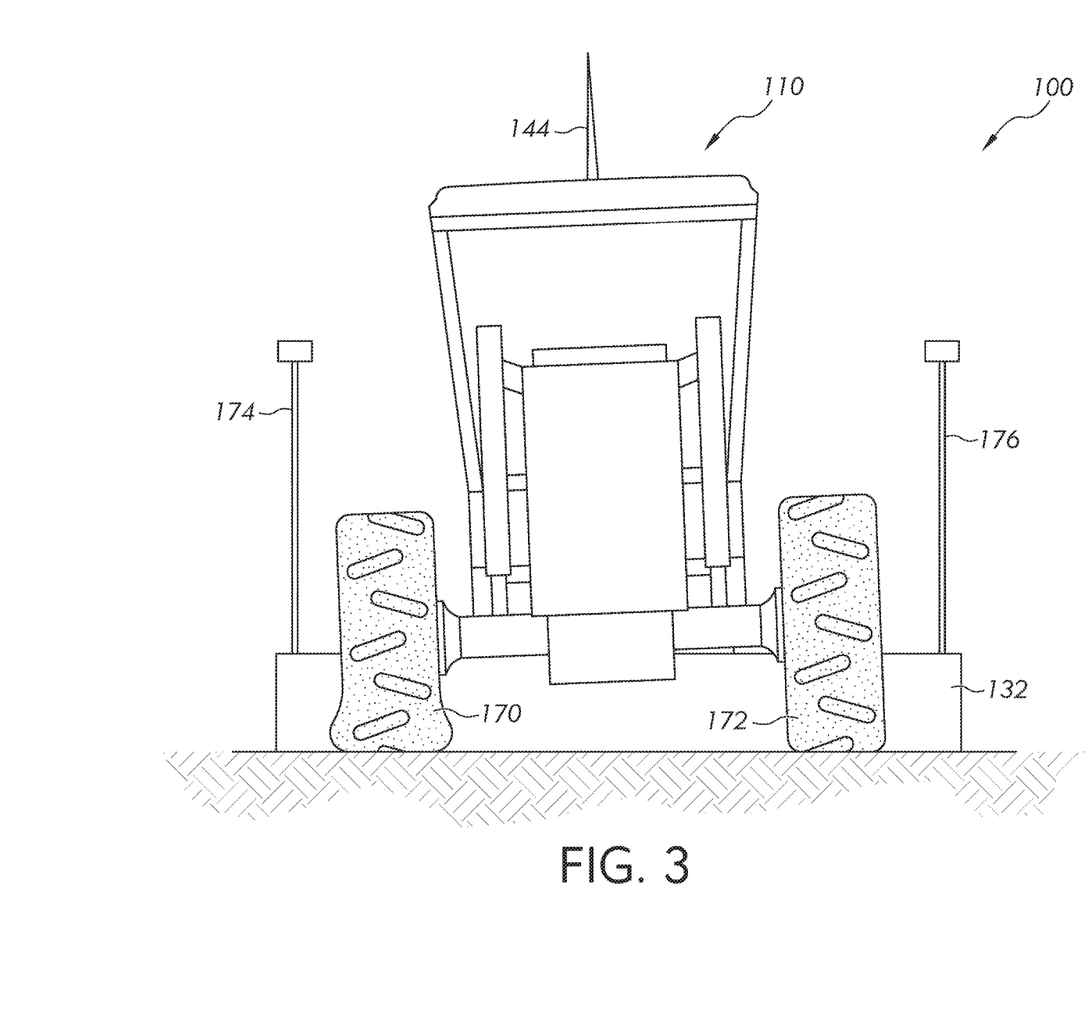
FIG. 3 is a front view of a motor grader including a tire with a low tire pressure.

FIG. 3 illustrates a front view of the motor grader 100 including a left front tire 170 and a right front tire 172, which represent the front tires 106 of FIG. 6. The position of the blade 132 is determined by a first mast 174 and a second mast 176, most often used in the sonic laser system which determines the location of each end of the blade 132, as is understood by those skilled in the art. The present disclosure is not limited to systems utilizing two masts, how but single mast systems or other multiple mast systems are also contemplated. The tires include pneumatic tires pressurized to a desired pressure with a gas, such as air or nitrogen.

As seen in FIG. 3, the left front tire 170 includes a reduced pressure when compared to the right front tire 172. The difference in tire pressure between tire 170 and tire 172 can result from different tire conditions or environmental conditions. In one condition, the tire 172 is pressurized to a standard or predetermined operating pressure, which is determined by a tire manufacturer, a vehicle manufacturer, or the operator of the vehicle. The tire 170, however, includes a pressure which is less than the pressure of the tire 172, resulting from a leak located in the tire 170 or from a leak appearing at the interface between the tire 170 and a wheel or rim supporting the tire. The reduced pressure of tire 170 is illustrated as the tire tread being somewhat compressed. In another condition, the tire 170 is set to a standard or predetermined operating pressure which is selected, for instance, on the condition of the ground or soil supporting the vehicle. In this second condition, the pressure of the tire 170 is reduced to accommodate a soft or muddy ground condition to provide increased traction through the reduced tire pressure. The pressure of tire 172, has been unintentionally over inflated or has increased due to an increase in the operating temperature of the tire, which increases the pressure in the tire.

In either of these conditions, or other conditions where the tire pressure is different between tires 170 and 172, or different with respect to any one of the other tires 108 of FIG. 1, the angle of the blade 132 with respect to ground is misaligned with respect to the angle of the blade 132. In these conditions, therefore, the finished grade of the ground is incorrect due to the incorrect orientation of the blade 132 with respect to ground due to unequal tire pressures. Because the blade angle is determined with respect to the frame of the vehicle 100 and the frame of the vehicle is not level due to tire pressure differences, the finished grade will not meet the desired grade level if left uncorrected.

To overcome the improper implement angle, one or more of the tire pressures or tire temperatures received by the electronic control unit 150 are used to adjust the angle of the implement. In different embodiments, a misalignment of the blade angle with respect to the surface, even for a relatively short period of time, reduces the productivity of the grader 100 until the source of the tire pressure discrepancy is determined and resolved.

Tire pressure information is provided to the ECU 150 by either the tire pressure sensors 164, the tire temperature sensors 166, or both the tire pressure sensors 164 and the tire temperature sensors 166. The determination of tire pressure is made depending on the type of tire sensors provided by the tire or equipment manufacturer. In some cases, both a tire pressure sensor and a tire temperature sensor are provided within one tire. In the case of a tire pressure sensor, the actual internal pressure of the tire is provided by the sensor 164 to the ECU 150. In the case of the tire temperature sensor, the actual or sensed internal temperature of the tire is converted to a tire pressure value by the ECU 150. The tire pressure related to the temperature is determined by the ECU 150 based on a mathematical determine of tire pressure based on temperature through a mathematical operation or through the use of a look-up table stored in the memory 161. The tire pressure signals are used by the ECU 150 to generate control signals to adjust the position of the implement 132 based on one or more tire pressures.

Figure 4:
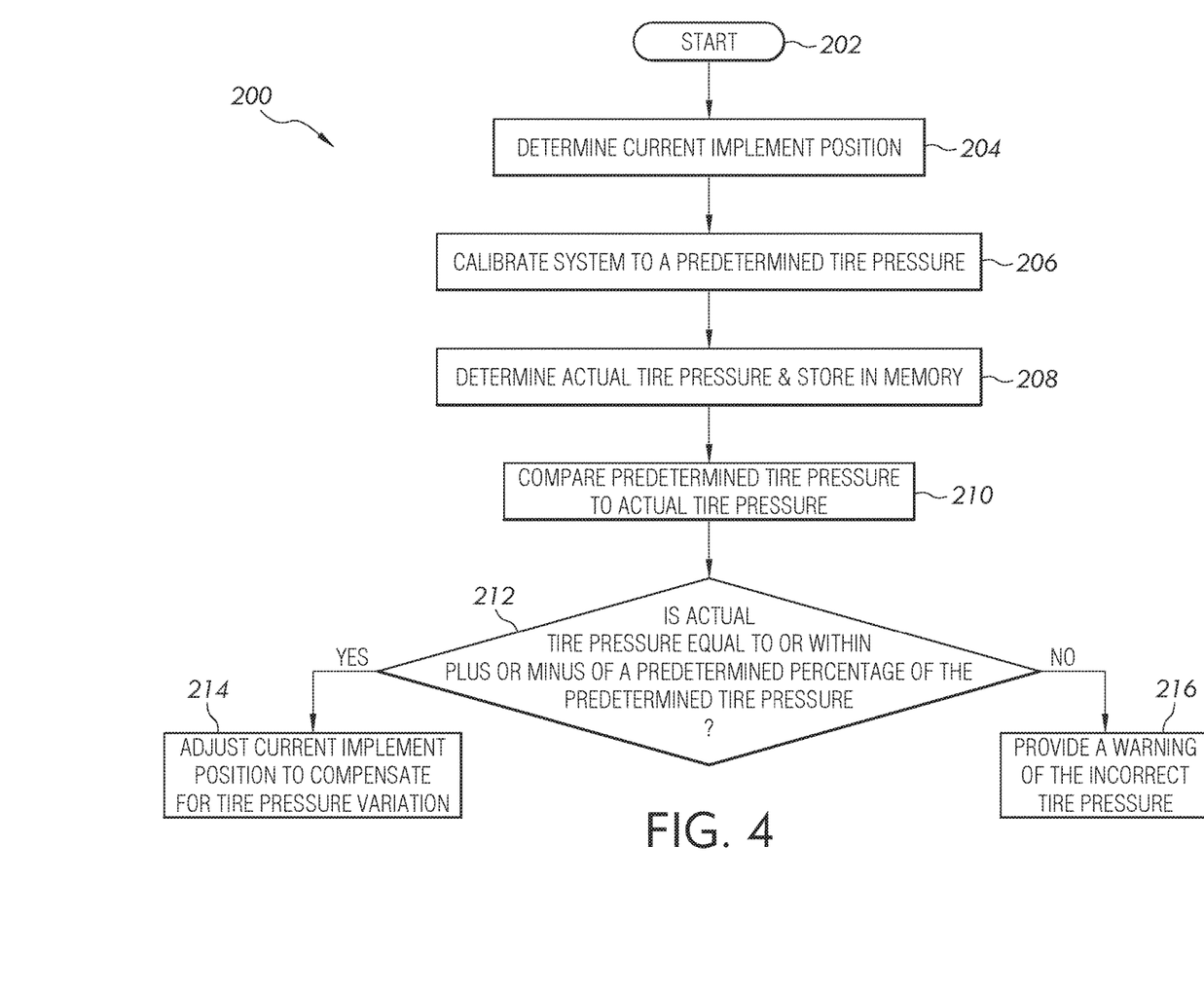
FIG. 4 is a flow diagram of a process to adjust the position of an implement coupled to a motor grader.

FIG. 4 illustrates a flow diagram 200 of a process to adjust the position of an implement being manipulated by a motor grader in response to a tire pressure of one or more tires of the motor grader. Initially, the process begins at start block 202, which in one embodiment, is initiated automatically once the vehicle is started. In another embodiment, the process is initiated manually once the operator initiates the process by flipping a switch, pressing a button, selecting from a menu, or by activating other user accessible inputs available on a control panel, a display, or a user interface.

Once the process has started, the vehicle system, such as the ECU 150, determines the current implement position at block 204. While this step is illustrated as occurring immediately after the start block 200, this step, in different embodiments, is implemented at other times during the process.

The system is set or calibrated to a predetermined tire pressure for each of the vehicle tires at block 206. The predetermined tire pressures, in different embodiments, are determined based on a manufacturer's suggested pressure(s) and are input to the ECU 150 through a user interface by an operator or service person responsible for the vehicle. In other embodiments, the predetermined tire pressures are permanently stored in the memory 161 based on the type of tires being used by the vehicle. In other embodiments, the predetermined tire pressures are determined and based on a condition of the ground being graded by the work vehicle. In this embodiment, the operator or service person inputs and stores the preferred values of tire pressures through the user interface.

Once the predetermined values of tire pressure are established, the ECU 150 determines actual tire pressures at block 208 based on the tire pressure data provided by one or more of either the tire pressure sensors or tire temperature sensors. Once identified by the ECU 150, the actual tire pressure from each of the tires is stored in the memory 161 for display or comparison with the predetermined tire pressures stored as calibrated values.

At block 210, the predetermined tire pressures for one or more of the tires are compared to the actual tire pressures that are stored in memory for one or more of the tires. The result of the comparison is evaluated at block 212 with respect to a predetermined percentage of the predetermined tire pressure(s). For instance, in one embodiment, the predetermined percentage is plus or minus ten (10) percent of the predetermined tire pressure. If the actual tire pressure is within the predetermined percentage, the current implement position is adjusted to compensate for the tire pressure variation at block 214. If however, the actual tire pressure is not within the predetermined percentage, a warning is provided to the operator indicating that the tire pressure of one or more tires is incorrect at block 216. The warning indicates that the ECU 150 has determined that the position of the implement 132 should not be adjusted based on the incorrect tire pressure.

In one embodiment, the ECU 150 transmits a signal to the display 168 indicating that the tire pressure of one or more of the tires is incorrect, In another embodiment, the ECU 150 prevents the implement 132 from being positioned for a grading operation. In still other embodiments, the ECU 150 prevents the vehicle from moving along the surface. In an additional embodiment, the ECU 150 turns off the vehicle, which in different embodiments is overridden by an operator or service person.

In other embodiments, if one or more of the tire pressures requires an adjustment to the tire pressure, the ECU 150 displays the tire pressure for each of the tires and indicates the sensed pressure value of each the tires. The display, in different embodiments, displays which of the tires requires an adjustment to the pressure, where the pressures may be either too high or too low with respect to a predetermined pressure.

In another embodiment, the ECU 150 constantly monitors the tire pressure(s) based on the signals received from the tire pressure sensors or the tire temperature sensors. In this embodiment, the position of the implement is adjusted relatively often, for instance after a certain period of time has elapsed, such as every 30 seconds. In a further embodiment, the position of the implement is adjusted continuously based on the receipt of tire pressures.

The machine control system updates the position of the implement based on the position of the frame of the vehicle with respect to the surface being graded. The desired grade target, which is constantly updated by the ECU 150, is used to control the position of the blade 132 in combination with the change to the implement position based on tire pressure. In one embodiment, the ECU 150 adjusts the position of the blade based on the desired grade target contour instruction or signal and an offset signal generated by the ECU 150 to compensate for grade deviations or irregularities resulting from the incorrect or undesirable tire pressure.

The ECU 150 adjusts the position of the blade 132 based on the commands provided by the machine control system which includes sonic systems, laser systems, global positioning systems (GPS), or other systems providing grade control information. These machine control system commands are supplemented or altered by commands generated by the ECU 150 based on tire pressures. In one embodiment, one or more valves are controlled by the ECU 150 to adjust one or both of the linkage arrangements 126 and 128.

Additional one or more valves, in different embodiments, adjust the actuator 130 in response to commands transmitted to the valves and generated by the ECU 150 based on the tire pressure commands. In other embodiments, an additional controller, other than the ECU 150 is provided which generates a pressure difference signal to adjust the position of the blade 132 based on differences in tire pressure. In different embodiments, this pressure difference signal is transmitted directly to the ECU 150 where blade adjustment are made or is transmitted directly to the devices being used to physical adjust the blade.

In other embodiments, operator controls, which are located in the cab 110, include an on/off switch to enable the operator to turn on or turn off the position adjustment control of the implement 132 based on the tire pressure. In other embodiments, the predetermined percentage of stored tire pressures is set by the operator at the user interface. In different embodiments, the selection of the predetermined percentage of stored tire pressures is input to the system by the operator or service person.

In one embodiment, the values of an acceptable range of tire pressures about a predetermined tire pressure are made based on the surface conditions and/or surface materials. The percentage of the predetermined tire pressure defines an acceptable range of the tire pressures, in which the position of the work implement is adjustable to compensate for a difference in tire pressure. The range of tire pressure about the predetermined tire pressure defines whether a sensed tire pressure is too low or too high when compared to the predetermined tire pressure.

While exemplary embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method of adjusting a position of a work implement coupled to a work vehicle having a frame supported by a plurality of tires to be pressurized to a predetermined tire pressure, the method comprising:
   establishing a grade target of a surface to be prepared by the work implement,
   identifying a position of the work implement with respect to the frame based on a signal received from a work implement sensor;
   identifying a tire pressure of one or more of the plurality of tires based on a signal received from a tire sensor; and
   adjusting the position of the work implement with respect to the frame using a linkage arrangement, wherein the adjusted position is based on the identified tire pressure of the one or more plurality of tires, wherein the adjusting the position of the work implement includes adjusting the position of the work implement to grade the surface based on the established grade target.

2. The method of claim 1 further comprising not adjusting the position of the work implement with respect to the frame when the identified tire pressure is not within a predetermined range of pressure with respect to the predetermined tire pressure.

3. The method of claim 1 wherein the
   establishing a grade target of a surface to be prepared by the work implement includes establishing the grade target based on a signal provided by a machine control system.

4. The method of claim 3 wherein the adjusting the position of the work implement includes adjusting the position in response to a contour instruction received from the machine control system.

5. The method of claim 4 wherein the machine control system is one of a 2D cross slope system and a 3D grade control system.

6. The method of claim 4 further comprising generating a tire pressure difference instruction and wherein the adjusting the position of the work implement includes adjusting the position of the work implement based on the contour instruction and the tire pressure difference instruction.

7. The method of claim 6 wherein the tire pressure difference instruction is based on a difference between a predetermined tire pressure and an actual tire pressure.

8. The method of claim 6 further wherein the predetermined tire pressure is one of a manufacturer's suggested tire pressure or a preferred tire pressure.

9. The method of claim 6 further comprising not adjusting the position of the work implement with respect to the frame when the identified tire pressure is not within a predetermined range of tire pressures with respect to the predetermined tire pressure.

10. The method of claim 9 further comprising preventing the vehicle from moving on the surface when the identified tire pressure is not within a predetermined range of pressure with respect to the predetermined tire pressure.

11. A work vehicle including a work implement operatively connected to a frame supported to move over a surface by a plurality of pneumatic tires comprising:
   an actuator operatively connected to the work implement, the actuator to move the work implement with respect to the frame;
   control circuitry operatively connected to the actuator, the control circuitry including a processer and a memory, wherein the memory has a plurality of program instructions stored thereon, that in response to execution by the processor causes the control circuitry to:
      establish a grade target of a surface to be prepared by the work implement;
      identify a position of the work implement with respect to the vehicle frame based on a signal received from a work implement sensor actuator;
      identify a tire pressure of one or more of the plurality of tires based a signal received from a tire sensor; and
      adjust the position of the work implement with respect to the frame using a linkage arrangement, wherein the adjusted position is based on the identified tire pressure of the one or more plurality of pneumatic tires and based on the established grade target.

12. The work vehicle of claim 11 wherein the processor causes the control circuitry to:
   not adjust the position of the work implement with respect to the frame when the identified tire pressure is not within a predetermined range of pressure with respect to the predetermined tire pressure.

13. The work vehicle of claim 11 wherein the processor causes the control circuitry to:
   establish a grade target of the surface to be prepared by the work implement includes establish the grade target based on a signal provided by a machine control system.

14. The work vehicle of claim 13 wherein the processor causes the control circuitry to:
adjust the position of the work implement in response to a contour instruction received from the machine control system.

15. The work vehicle of claim 14 wherein the machine control system is one of a 2D cross slope system and a 3D grade control system.

16. The work vehicle of claim 14 wherein the processor causes the control circuitry to:
generate a tire pressure difference instruction; and
adjust the position of the work implement based on the contour instruction and the tire pressure difference instruction.

17. The work vehicle of claim 14 wherein the processor causes the control circuitry to:
not adjust the position of the work implement with respect to the frame when the identified tire pressure is not within a predetermined range of pressure with respect to the predetermined tire pressure.

18. A work vehicle grade control system of a vehicle having a plurality of pneumatic tires, a frame supported by the plurality of tires, and a grader blade to move through a range of positions with respect to the frame to grade a surface, the control system comprising:
a machine control system operatively connected to the frame, the machine control system to provide a grade signal;
a tire pressure sensor operatively connected to the at least one of the plurality of tires, the tire pressure sensor to provide a tire pressure signal;
an actuator operatively connected to the grader blade, the actuator to move the grader blade with respect to the frame;
control circuitry operatively connected to the grade control system, the tire pressure sensor and the actuator, the control circuitry including a processer and a memory, wherein the memory has a plurality of program instructions stored thereon, that in response to execution by the processor causes the control circuitry to:
identify a current grade of the surface based on the grade signal received from the machine control system;
identify a position of the grader blade with respect to the surface;
identify a tire pressure of one or more of the plurality of tires; and
adjust the position of the grader blade with respect to the frame based on the identified current grade and the identified tire pressure of the one or more plurality of pneumatic tires.

19. The work vehicle grade control system of claim 18 wherein the processor causes the control circuitry to:
adjust the position of the grader blade based on a contour instruction received from a machine control system and the tire pressure difference instruction.

20. The work vehicle grade control system of claim 19 wherein the processor is causes the control circuitry to:
adjust the position of the grader blade during movement of the work vehicle over the surface.

* * * * *